United States Patent [19]

Townsend

[11] Patent Number: 4,811,459
[45] Date of Patent: Mar. 14, 1989

[54] BLADE FOR MEAT SKINNING MACHINES

[75] Inventor: Ray T. Townsend, Des moines, Iowa

[73] Assignee: Townsend Engineering Company, Des Moines, Iowa

[21] Appl. No.: 196,234

[22] Filed: May 20, 1988

[51] Int. Cl.⁴ ............................................. A22C 17/12
[52] U.S. Cl. ....................................................... 17/21
[58] Field of Search ................ 17/21, 62, 50; 99/588, 99/589, 590

[56] References Cited

U.S. PATENT DOCUMENTS

| | | | |
|---|---|---|---|
| 866,354 | 9/1907 | Gill | 99/588 |
| 3,360,026 | 12/1967 | Schill | 17/21 X |
| 4,393,761 | 7/1983 | Murphy | 99/589 |

Primary Examiner—Willie G. Abercrombie
Attorney, Agent, or Firm—Zarley, McKee, Thomte, Voorhees & Sease

[57] ABSTRACT

A blade means for a meat skinning machine is disclosed. The blade means involves an elongated blade element having a tapered cutting edge portion terminating in a cutting edge, and upper and lower surfaces. The blade element includes a heel portion comprising an elongated edge surface terminating in a lower heel line which is parallel to the cutting edge of the blade. The angle between the cutting edge and the heel line is greater than the angle comprising the tapered cutting edge portion. Preferably, the angle comprising the tapered cutting edge portion is in the order of 30° or less, and the angle between the cutting edge and the heel line is in the order of 20°–45°. One embodiment of the invention provides a blade with a plastic strip partially adhered to the underside of the blade. A shoulder on the strip provides a heel line. The free edge of the blade is received in a slot in the skinning machine shoe, and the free edge of the strip conforms to the arcuate lower surface of the shoe.

15 Claims, 2 Drawing Sheets

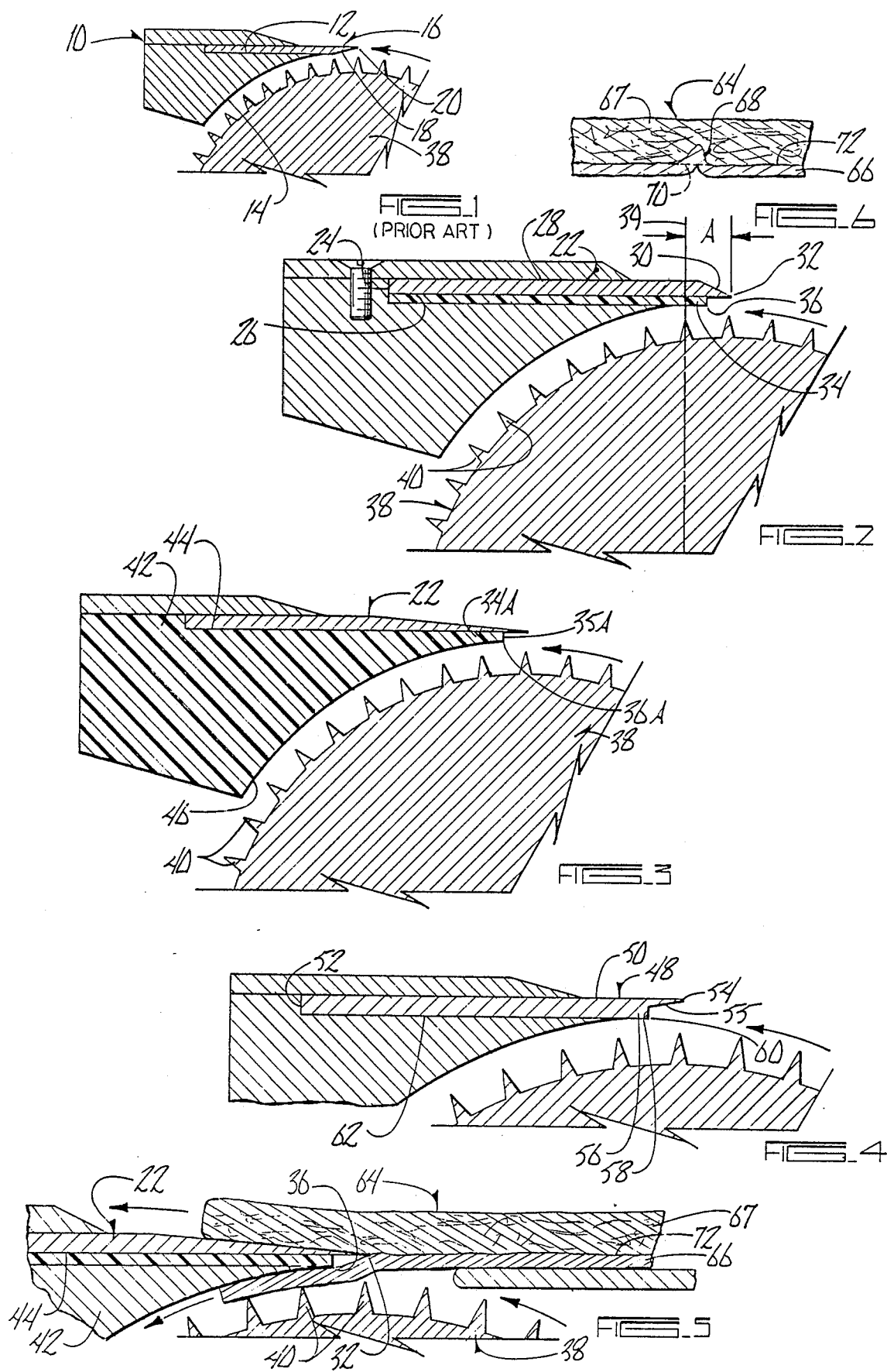

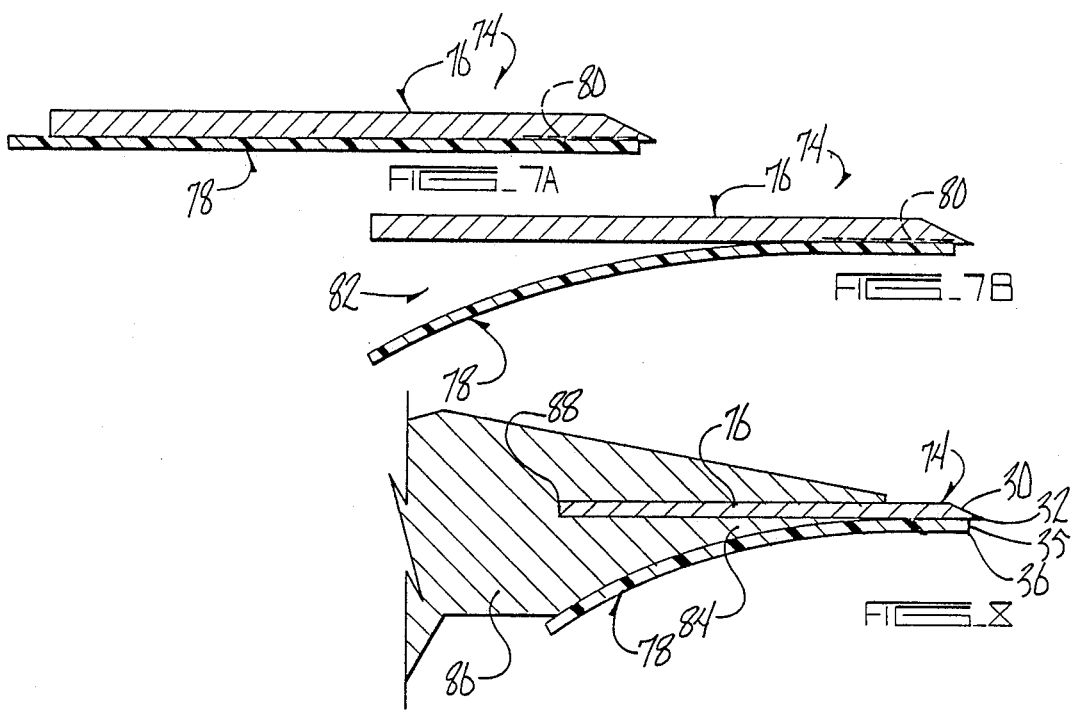
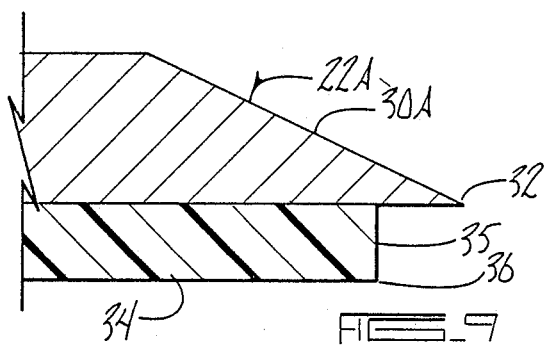
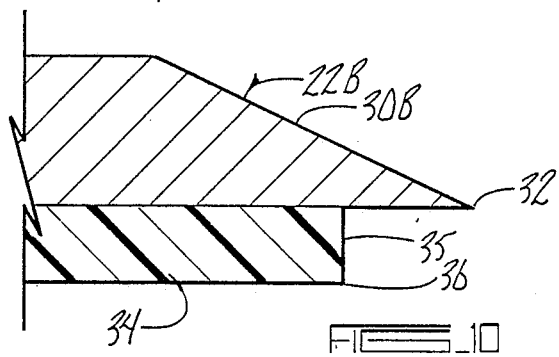
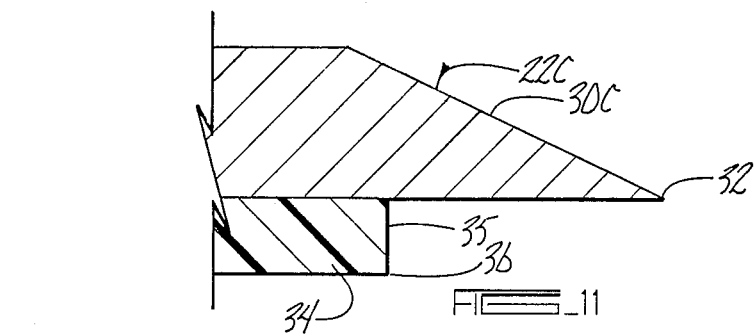

4,811,459

BLADE FOR MEAT SKINNING MACHINES

BACKGROUND OF THE INVENTION

Skinning blades of conventional meat skinning machines are straight and present a beveled cutting edge to trim skin or membrane from meat, poultry and fish. The blades are disposable and are replaced as soon as they become dull. Sharp blades have a longer useful life than a duller blade. However, the finely honed blades have a serious shortcoming in that if there is a wrinkle in the skin to be removed from the meat product, the blade will slice through the wrinkle rather than force the skin to be pulled down under the blade. When this happens, a portion of skin is left on the lean meat, and these skin "patches" are normally manually removed by knives or the like. Not only is this manual operation expensive, but the manual operation often causes meat to be removed with the skin patches, and this diminishes the yield of meat from the original meat product.

Because of this shortcoming of the highly sharpened blades, conventional blades are usually not as sharp as they might be. This blade becomes dull much more quickly, but it does a better job pulling wrinkled skin underneath the blade rather than slicing through the wrinkled portion.

Therefore, a principal object of this invention is to provide a blade for meat skinning machines that can be honed to a highly sharpened condition to provide ease in severing skin and which will effectively pull the skin on the meat product below the blade even when encountering wrinkled skin.

A further object of this invention is to provide an economical means for supporting a finely-honed blade closely adjacent its cutting edge.

These and other objects will be apparent to those skilled in the art.

SUMMARY OF THE INVENTION

The blade means comprising this invention involves an elongated blade element having a tapered cutting edge portion terminating in a cutting edge, and upper and lower surfaces. The blade element includes a heel portion comprising an elongated edge surface terminating in a lower heel line which is parallel to the cutting edge of the blade. The angle between the cutting edge and the heel line is greater than the angle comprising the tapered cutting edge portion. Preferably, the angle comprising the tapered cutting edge portion is 30° or less, and the angle between the cutting edge and the heel line is in the order of 20°–45°. One embodiment of the invention provides a blade with a plastic strip partially adhered to the underside of the blade. A shoulder on the strip provides a heel line. The free edge of the blade is received in a slot in the skinning machine shoe, and the free edge of the strip conforms to the arcuate lower surface of the shoe.

BRIEF DESCRIPTION OF THE DRAWINGS

FIG. 1 is an end elevational view of a prior art blade and blade-holding means of a conventional meat skinning device;

FIG. 2 is an enlarged scale end elevational view of the preferred blade embodiment of this invention;

FIG. 3 is a sectional view through an alternate form of the invention showing the blade of FIG. 2 mounted in a specific blade-holding means;

FIG. 4 is an end elevational view of a modified blade element;

FIG. 5 is an enlarged sectional view through a skinning machine with the blade mechanism of FIG. 3 showing the manner of meat being skinned;

FIG. 6 is a sectional view through a meat product showing a fold in the skin;

FIG. 7A is a transverse sectional view of a further modified form of the invention;

FIG. 7B shows the device of FIG. 7A in an "open" position to be mounted on a skinning machine shoe;

FIG. 8 is a view similar to that of FIG. 7B showing the device of FIGS. 7A and 7B in assembled condition on a shoe element of a skinning machine; and FIGS. 9, 10, and 11 are enlarged scale fragmentary sectional views of the cutting portions of the blades of the general type shown in FIGS. 2, 3, 5, 7A, 7B, and 8 showing variations in the angle between the cutting edge of the blade and the heel line of the blade means.

DETAILED DESCRIPTION OF THE PREFERRED EMBODIMENT

The term "meat" or "meat product" as used herein will be understood to include meat, poultry and fish products. The terms "skin" and "membrane" will be used synonymously herein, unless specifically designated otherwise.

FIG. 1 shows a conventional blade holder or shoe 10 having an elongated slot 12 and a lower curved surface 14 to accommodate the outer periphery of a conventional gripping roll. A conventional elongated blade 16 is mounted in slot 12 and has a beveled or tapered portion 18 terminating in a cutting edge 20. The tapered portion 18 creates an angle of less than 30°. The structure of FIG. 1 comprises a prior art device and the present invention constitutes an improvement thereover.

With reference to FIG. 2, the numeral 22 designates a cutting blade having a rearward edge 24, a flat-bottomed surface 26, a partial flat upper surface 28 which terminates in a tapered cutting edge portion 30. The tapered cutting edge portion 30 in turn terminates in a sharp cutting edge 32. The tapered cutting edge portion 30 preferably comprises an angle of less than 30°.

A heel portion 34 comprised of plastic material is secured by any convenient means to the flat-bottomed surface 26 of cutting blade 22. Heel portion 34 includes a heel surface 35 which preferably extends vertically downward from the flat-bottomed surface 26 and terminates in a heel line 36.

The vertical thickness of heel portion 34 is preferably in the order of 0.010 inches. Similarly, the cutting edge 32 extends beyond the heel surface 35 approximately 0.010 inches. The vertical thickness of blade 22 is usually in the order of 0.027 inches. The angle between the cutting edge 32 and the heel line 36 in FIG. 2 is 45° with respect to a horizontal plane passing through the cutting edge 32. This angle preferably should be in the range of 20°–45°.

The conventional gripping roll 38 is shown in FIG. 2 and is adapted to be mounted on the frame of the skinning machine and is powered to rotate in a counterclockwise direction as depicted in FIG. 2. A vertical center line or radius 39 passing through the center of gripping roll 38 is preferably approximately 1/16 of an inch rearwardly from cutting edge 32 as denoted by the dimension A in FIG. 2. Gripping roll 38 has a plurality of conventional gripping teeth 40 on its outer periphery.

Blade 22 is shown to be mounted in an alternate blade-holding means in FIG. 3. In that figure, plastic blade-holder 42 is provided with slot 44 to receive a blade 22. Blade-holder 42 has a curved surface 46 to accommodate the periphery of the conventional gripping roll 38. Plastic blade-holder 42 has heel portion 34A, heel surface 35A, and heel line 36A which correspond to the previously described like components 34, 35 and 36, respectively.

An alternate form of the invention is shown in FIG. 4 by blade 48. The essential difference between blade 48 and blade 22 is that the tapered cutting edge portion of blade 48 is formed on a lower surface of the blade rather than the upper surface of the blade. Specifically, blade 48 has a flat upper surface 50, a rearward edge 52, and a cutting edge 54. A tapered cutting edge portion 55 extends downwardly and rearwardly from cutting edge 54. This cutting edge portion 55 should create an angle of less than 30° with respect to the flat upper surface 50. Blade 48 has a heel portion 56, a heel surface 58, and a heel line 60 which essentially correspond to the like components of blade 22 designated by the numerals 34, 35, and 36, respectively. Blade 48 has a partial flat lower surface 62.

The device of FIG. 2 has been shown to be created from a metal blade 22 and a plastic heel portion 34. The blade 48 of FIG. 4 is shown to be comprised of a single metal piece including both the blade and the heel portion. Obviously, the blade 22 and heel portion 34 could be comprised of a single metal material. However, there are fabrication advantages in allowing the blade and the heel portion to be of separate materials because this facilitates the fabrication of the heel surface 35 which creates the heel line 36.

While the heel surface 35 has been shown to be vertical, and the heel line 36 is essentially located at the apex of a 90° angle, the heel surface 35 could be slightly beveled, or the heel line 36 could occur on a slightly rounded corner, both without substantially departing from the essence of this invention.

FIG. 6 shows a meat product 64 with a skin layer 66 and lean meat 67. A fold 68 exists in the skin, and the dotted line 70 shows the path of cut of conventional sharp blades that cut through the fold 68 without pulling the folded skin below the blade.

FIG. 5 shows how the blade of this invention pulls skin downwardly through an angle of 20°-45° between the cutting edge 32 and heel line 36. This structure causes the fold 68 of FIG. 6 to "unfold" and serves to guide the cutting edge along the preferred cutting line 72 between the skin layer 66 and lean meat 67.

FIGS. 7A, 7B and 8 show a modified blade assembly 74 having a blade element 76 and a plastic heel portion 78. Heel portion 78 is comprised of a plexiglass strip of flexible material in the order of 0.010 inches thick and ⅜ inches wide secured to the bottom of blade element 76 along glue line 80. Any conventional adhesive capable of adhering plastic to metal can be used to create glue line 80. The portion of heel portion 78 rearward of glue line 80 creates an operable slot 82 which can be spread open on lip 84 of shoe 86 (FIG. 8) as blade element 76 is received in slot 88. Blade assembly 74 has a tapered cutting edge portion 30, cutting edge 32, heel surface 35, and heel line 36 as does the structure of FIG. 2.

Blades 22A, 22B, or 22C are shown in FIGS. 9-11. These blades show the cutting portions of the blades of the general type shown in FIGS. 2, 3, 5, 7A, 7B, and 8. The angle between the cutting edges 32 of these blades and the heel line 36 are approximately 45°, 37.5°, and 30°, respectively, as measured from a horizontal plane passing through the cutting edges. These angles can be established with precision during manufacture. The operator can replace blade assemblies in the manner indicated by mounting a blade assembly with the desired blade configuration on the skinning machine shoe.

This invention provides all the advantages of a long-lasting, finely-honed cutting blade having a very sharp tapered cutting edge. At the same time, the presence of the heel portion in each of the embodiments of this invention prevents the very sharp cutting edge of the blades 22, 48, and 76 from cutting through wrinkled portions of skin. This phenomenon is prevented by the presence of the heel portions described heretofore which serve to cause the skin or membrane to be pulled down underneath the cutting edge of the blade so that the cutting edge of the blade follows the cutting plane, or line 72, between the meat and the skin. As a result, the presence of skin patches on the skinned meat product are eliminated as is the necessity for manually removing the skin patches and the wastage of meat that is lost during this operation.

Thus, it is apparent that this invention achieves at least all of its stated objections.

I claim:

1. A blade means for meat skinning machines, comprising,
   an elongated blade means having a rearward edge and an opposite tapered cutting edge portion terminating in a cutting edge and upper and lower surfaces,
   said blade means including a heel portion comprising an elongated edge surface terminating in a lower heel line which is parallel to said cutting edge,
   the angle between said cutting edge and said heel line being approximately between 20° and 45° relative to a horizontal plane passing through said cutting edge.

2. The blade means of claim 1 wherein the bottom surface of said blade means is substantially flat.

3. The blade means of claim 1 wherein the top surface of said blade means is substantially flat.

4. The device of claim 1 wherein said heel portion is comprised of a plastic material, and said blade means is comprised of metal.

5. A blade means for meat skinning machines, comprising,
   an elongated blade means having a rearward edge and an opposite tapered cutting edge portion terminating in a cutting edge and upper and lower surfaces,
   said blade means including a heel portion comprising an elongated edge surface terminating in a lower heel line which is parallel to said cutting edge,
   and the angle between said cutting edge and said heel line being greater than the angle comprising said tapered cutting edge portion.

6. The blade means of claim 5 wherein the bottom surface of said blade means is substantially flat.

7. The blade means of claim 5 wherein the top surface of said blade means is substantially flat.

8. The device of claim 5 wherein said heel portion is comprised of a plastic material, and said blade means is comprised of metal.

9. A blade insert assembly for meat skinning machines, comprising, an elongated cutting blade means having a rearward edge and an opposite tapered cutting edge portion terminating in a cutting edge and upper and lower surfaces, said blade means including a heel portion, said heel portion comprising a flexible strip of plastic material having an upper surface, adhesive material partially securing said upper surface of said strip to a lower surface of said blade means to create an operable slot therebetween for reception of a lip element on a skinning machine shoe.

10. The device of claim 9 wherein the angle between said cutting edge and said heel line being approximately between 20° and 45° relative to a horizontal plane passing through said cutting edge.

11. The device of claim 9 wherein said slot is adjacent the rearward edge of said cutting blade means.

12. The device of claim 9 wherein said heel portion comprises an elongated edge surface terminating in a lower heel line which is parallel to said cutting edge, the angle between said cutting edge and said heel line being greater than the angle comprising said tapered cutting edge portion.

13. The device of claim 12 wherein the angle between said cutting edge and said heel line being approximately between 20° and 45° relative to a horizontal plane passing through said cutting edge.

14. The device of claims 9 or 12 wherein the blade insert assembly is mounted on a meat skinning machine having a frame, meat gripping roll mounted on said frame, a shoe means mounted on said frame adjacent said meat gripping roll and having a horizontal slot and a lower arcuate surface separated by a lip element, with the rearward edge of said blade means being mounted in said horizontal slot and said strip partially engaging said lower arcuate surface of said shoe as said lip element is received in said operable slot of said blade insert assembly.

15. The device of claims 9 or 12 wherein the blade insert assembly is mounted on a meat skinning machine having a frame, meat gripping roll mounted on said frame, a shoe means mounted on said frame adjacent said meat gripping roll and having a horizontal slot and a lower arcuate surface separated by a lip element, with the rearward edge of said blade means being mounted in said horizontal slot and said strip partially engaging said lower arcuate surface of said shoe as said lip element is received in said operable slot of said blade insert assembly and wherein the angle between said cutting edge and said heel line being approximately between 20° and 45° relative to a horizontal plane passing through said cutting edge.

* * * * *